Figure 1:
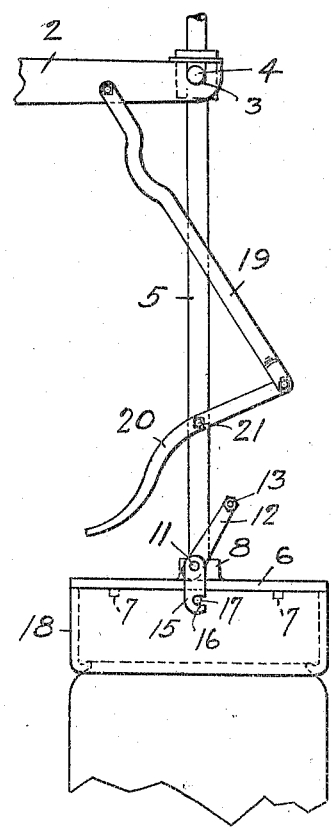

G. C. DEBAY.
GLASS DRAWING BAIT.
APPLICATION FILED MAR. 3, 1917. RENEWED MAR. 15, 1919.

1,321,810.

Patented Nov. 18, 1919.

INVENTOR
George C. Debay
By Kay Totten & Powell
Attorneys

UNITED STATES PATENT OFFICE.

GEORGE C. DEBAY, OF SPRINGDALE, PENNSYLVANIA, ASSIGNOR, BY MESNE ASSIGNMENTS, TO UNIVERSAL GLASS COMPANY, OF NEW KENSINGTON, PENNSYLVANIA, A CORPORATION OF DELAWARE.

GLASS-DRAWING BAIT.

1,321,810.        Specification of Letters Patent.        Patented Nov. 18, 1919.

Application filed March 3, 1917, Serial No. 152,389. Renewed March 15, 1919. Serial No. 282,962.

*To all whom it may concern:*

Be it known that I, GEORGE C. DEBAY, a citizen of the United States, and resident of Springdale, in the county of Allegheny and State of Pennsylvania, have invented a new and useful Improvement in Glass-Drawing Baits; and I do hereby declare the following to be a full, clear, and exact description thereof.

My invention relates to baits for drawing glass cylinders.

In the drawing of glass cylinders where a bait is lowered into a body of molten glass and then gradually raised while air is admitted to the interior of the cylinder in order to hold it out to the proper diameter, it is usual to have the bait permanently secured to the blow-pipe and this blow-pipe is suspended from a vertically-traveling cage, so that when the cylinder has been drawn and it is desired to lower the same, the bait and blow-pipe are disconnected from the cage and as the cylinder is lowered, the cylinder is moved out at an angle so that when brought down into position to rest upon the horse, the cylinder is in a horizontal position with the blow-pipe and the bait still attached thereto. The cylinder is then cut up by cutting it circumferentially into suitable lengths, but before this is done, the cylinder is capped off at a point adjacent to the bait, so as to relieve the cylinder from the strain due to the bait in addition to the weight of the blow-pipe. The weight of the blow-pipe sometimes creates such a strain on the cylinder after it has been lowered onto the horse as to cause it to break the cylinder at some distance from the bait, thereby causing considerable loss.

The object of my invention is to provide means for disconnecting the bait from the blow-pipe after the cylinder has been lowered onto the horse, so as to relieve the cylinder of the weight of the blow-pipe and so reduce the liability of breakage.

To these ends my invention comprises the removable bait which may be readily freed from connection with the blow-pipe, all as fully hereinafter set forth and claimed.

Figure 3:
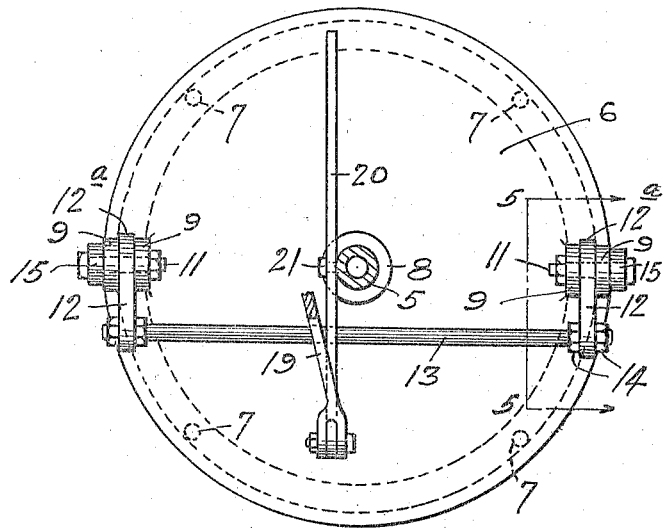
Figure 4:
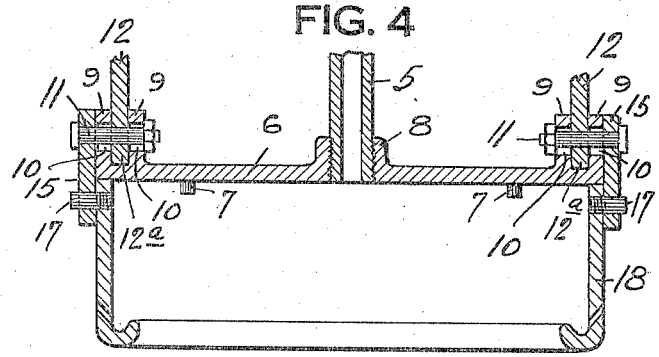
Figure 2:
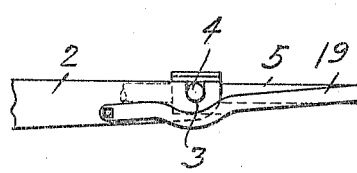
Figure 5:
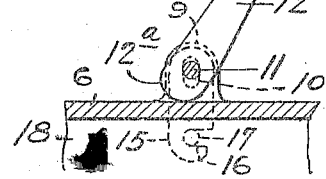

In the drawing, Figure 1 is a view of my improved bait with a portion of a cylinder attached thereto showing the position of the parts during the drawing of the cylinder; Fig. 2 is a view showing the position of the parts when the cylinder is lowered to horizontal position; Fig. 3 is an enlarged plan view partly in section; Fig. 4 is an enlarged cross-section; Fig. 5 is a section on the line 5—5, Fig. 3.

Referring to the drawing, the numeral 2 designates a suitable arm or support which is connected up with a raising and lowering device by means of which the arm is moved up and down, said arm having the seat 3 to receive the trunnion or pin 4 on the blow-pipe 5. In this manner, the blow-pipe is suspended from the arm 2 and said blow-pipe is adapted to swing in the seat 3, even to a horizontal position as shown in Fig. 2.

The lower end of the blow-pipe is secured to the plate or drawing head 6 with the guide lugs 7 formed on the inner face thereof adjacent to the periphery of the said plate. The blow-pipe 5 may be threaded into the threaded collar 8 on said plate, as shown in Fig. 4.

The plate 6 has the lugs 9 formed at opposite sides thereof, said lugs having the slots 10 formed therein through which the bolts 11 pass, said bolts passing through the arms 12, held between the pairs of lugs. The outer ends of the arms 12 are connected up by the rod 13, the nuts 14 acting to secure said arms to said rod.

The arms 12 have the cam portions $12^a$ which are adapted to bear against the plate 6 for the purpose fully hereinafter set forth.

The latches 15 are mounted to swing on the bolts 11, said latches having notches 16 adapted to engage the pins 17 on the bait 18.

When the bait 18 is attached to the plate 6, the notches 16 in the latches 15 engage the pin 17 and by moving the arms 12 the cam portions of said arms act to pull up on the latches 15 and so securely bind or fasten the bait 18 to the plate 6.

To provide for the automatic release of the latches so as to permit of the separation of the bait from the plate and blow-pipe, I provide the following mechanism: A rod 19 is pivotally connected to the arm 2 at one end and at its opposite end said rod is connected to the arm 20, pivotally connected to the blow-pipe at 21.

When the cylinder is being drawn, the parts will be in the position indicated in Fig. 1, the latches 15 being locked by the arms 12 so as to securely fasten the bait 18 to the plate 6. After the cylinder has been drawn and it is desired to lower same, the arm 2 supporting the blow-pipe and cylinder is lowered, and as said arm is lowered the cylinder is swung out at an angle and is finally brought down to a horizontal position as indicated in Fig. 2, in order to bring it into position upon the horse which is to support it during the operation of capping and cutting it up into suitable lengths. It will be apparent that by this lowering operation the blow-pipe 5 will be gradually brought to a horizontal position as indicated in Fig. 2, and in so doing the rod 19 and arm 20 act on the principle of a toggle so that the arm 20 is moved over into position to engage the rod 13 and will act to move said rod, thereby moving the arms 12 and freeing the latches 15 so that said latches are free to swing out of engagement with the pins 17 as shown in dotted lines Fig. 2, whereby the bait is released from the plate 6 and the blow-pipe can be swung out of the way, leaving the bait alone attached to the cylinder. Or the cylinder with the bait may be withdrawn from the plate, as indicated in dotted lines, Fig. 2. In either event, the cylinder is relieved when lowered of the weight of the blow-pipe and that, too, automatically, while at the same time, the danger of the breaking of the cylinder due to the weight of the blow-pipe is practically eliminated, and a great saving is thus effected in the output. After the cylinder has been capped off adjacent to the bait, the bait is then in position to be used again and is attached to the plate 6 in the way above described by means of the latches 15 which are locked securely in place by the arms 12.

What I claim is:

1. The combination of a vertically-movable support, a blow-pipe suspended therefrom, a bait detachably secured to the lower end of said blow-pipe and means for releasing said bait, said means being put in operation by the swinging of said blow-pipe from its support.

2. The combination of a vertically-movable support, a blow-pipe suspended therefrom, a plate carried by said blow-pipe, a bait detachably connected to said plate, and means for releasing said bait put into operation by the swinging movement of said blow-pipe from its support.

3. The combination of a vertically-movable support, a blow-pipe suspended therefrom, a plate carried by said blow-pipe, a bait, locking mechanism connecting said bait to said plate, and means put in operation by the swinging of said blow-pipe for unlocking said locking mechanism to release said bait.

4. The combination of a vertically-movable support, a blow-pipe suspended therefrom, a plate connected to said blow-pipe, a bait, latches carried by said plate engaging said bait, and means put in operation by the swinging of said blow-pipe from said support to release said latches.

5. The combination of a vertically-movable support, a blow-pipe suspended therefrom, a plate carried by said blow-pipe, a bait, latches carried by said plate engaging said bait, locking mechanism for said latches, and means put in operation by the swinging of said blow-pipe from said support to unlock said locking mechanism.

6. The combination of a vertically-movable support, a blow-pipe suspended therefrom, a plate carried by said blow-pipe, said plate having slotted lugs, cam arms, pins passing through said slotted lugs engaging said arms, latches carried by said pins, a bait, pins on said bait engaged by said latches, a rod connecting said arms and means put in operation by the swinging of said blow-pipe from its support for freeing said cam-arms.

7. The combination of a vertically-movable support, a blow-pipe suspended therefrom, a plate carried by said blow-pipe, a bait, latches carried by said plate engaging said bait, means carried by said plate for locking said latches, and means carried by said support and said blow-pipe moving into engagement with locking means when said blow-pipe swings in its support, whereby said locking means is operated to release said latches.

8. A combination of a vertically-movable support, a blow-pipe suspended therefrom, a plate carried by said blow-pipe, locking arms on said plate, latches carried by said plate, a bait engaged by said latches, and toggle acting levers carried by said support and blow-pipe adapted by the swinging of said blow-pipe in its support to release said locking arms.

In testimony whereof, I the said GEORGE C. DEBAY, have hereunto set my hand.

GEORGE C. DEBAY.

Witnesses:
JOHN F. WILL,
JOHN R. KELLER.